(12) United States Patent
Ross et al.

(10) Patent No.: US 7,578,510 B2
(45) Date of Patent: Aug. 25, 2009

(54) SULKY INCLUDING STEERABLE WHEELS

(76) Inventors: Beverly W. Ross, 5765 Lochmoor Ct., Rochester, MI (US) 48306-2351; Tamaira E. Ross, 2930 1st Ave. N., Seattle, WA (US) 98109

( * ) Notice: Subject to any disclaimer, the term of this patent is extended or adjusted under 35 U.S.C. 154(b) by 173 days.

(21) Appl. No.: 11/746,964

(22) Filed: May 10, 2007

(65) Prior Publication Data
US 2007/0262544 A1    Nov. 15, 2007

Related U.S. Application Data (60) Provisional application No. 60/746,955, filed on May 10, 2006.

(51) Int. Cl.
    *B62C 1/08* (2006.01)
(52) U.S. Cl. ................. 280/63; 280/68; 280/69
(58) Field of Classification Search ............ 280/63, 280/64, 446.1, 460.1, 488, 489, 657, 155, 280/66, 70, 47.24, 47.25, 47.131, 68, 69, 280/76
    See application file for complete search history.

(56) References Cited

U.S. PATENT DOCUMENTS

| | | | | |
|---|---|---|---|---|
| 283,916 A | * | 8/1883 | Newberry | 280/63 |
| 0,395,375 A | | 1/1889 | Yale | |
| 491,591 A | * | 2/1893 | Pray | 280/63 |
| 0,502,984 A | | 8/1893 | McIntosh | |
| 0,550,885 A | | 12/1895 | Higley | |
| 562,702 A | * | 6/1896 | Brookman | 280/64 |
| 0,571,003 A | | 11/1896 | Keeler | |
| 0,629,237 A | | 7/1899 | Cheney | |
| 0,708,426 A | | 9/1902 | Tait | |
| 2,377,641 A | | 6/1945 | Miner | |
| 3,163,438 A | | 12/1964 | Bliss, Jr. | |
| 3,415,533 A | | 12/1968 | Bliss, Jr. | |
| 3,503,624 A | | 3/1970 | Weber et al. | |
| 3,628,806 A | | 12/1971 | Weber | |
| 4,033,598 A | * | 7/1977 | King | 280/63 |
| 4,071,257 A | * | 1/1978 | Discount | 280/63 |
| 4,078,829 A | * | 3/1978 | Davis | 280/657 |
| 4,095,815 A | | 6/1978 | Mitchell | |
| 4,817,975 A | | 4/1989 | Saraydar | |
| 4,863,180 A | | 9/1989 | Guarino et al. | |
| 5,174,594 A | * | 12/1992 | Marshall et al. | 280/63 |
| 5,183,279 A | | 2/1993 | Acerno et al. | |
| 5,607,170 A | | 3/1997 | Capjon et al. | |

(Continued)

*Primary Examiner*—Hau V Phan
(74) *Attorney, Agent, or Firm*—Howard & Howard Attorneys PLLC (57) ABSTRACT

A sulky includes a frame and a first and second wheel supports. The first wheel support extends along a first axis and is rotatably coupled to the frame about the first axis. The second wheel support extends along a second axis and is rotatably coupled to the frame about the second axis. First and second pedals are operatively coupled to the frame and to the first and second wheel supports, respectively. The first and second pedals are moveable relative to the frame for rotating the first wheel support about the first axis and for rotating the second wheel support about the second axis. A linkage operatively couples the first and second wheel supports for transferring movement of one of the first and second pedals to both of the first and second wheel supports to rotate the first and second wheel supports in unison respectively about the first and second axes.

18 Claims, 4 Drawing Sheets

U.S. PATENT DOCUMENTS 6,095,536 A * 8/2000 Stein et al. .................... 280/63
6,247,711 B1 6/2001 Saraydar
6,354,613 B1 * 3/2002 Stein et al. .................... 280/63

* cited by examiner

SULKY INCLUDING STEERABLE WHEELS

CROSS-REFERENCE TO RELATED APPLICATIONS

The subject patent application claims priority to and all the benefits of U.S. Provisional Patent Application Ser. No. 60/746,955 which was filed on May 10, 2006.

BACKGROUND OF THE INVENTION

1. Field of the Invention

The present invention generally relates to a sulky, and specifically, to a sulky with steerable wheels.

2. Description of the Related Art

A sulky is used in a type of horse racing commonly referred to as harness racing, or more specifically, low-wheeled harness racing. In harness racing, a rider rides on the sulky. The sulky is harnessed to a horse, and the horse pulls the sulky around a track. The sulky is also referred to as a bike. The sulky includes a frame and first and second wheel supports each supporting a wheel. The first wheel support extends from the frame along a first axis. The second wheel support is spaced from the first wheel support and extends from the frame along a second axis.

In non-steerable sulkies, the first and second wheel supports are not steerable by the rider, e.g., the first and second wheel supports are stationary relative to the frame. In steerable sulkies, the first wheel support is rotatably coupled to the frame about the first axis and the second wheel support is rotatably coupled to the frame about the second axis. In other words, the first and second wheel supports are independently rotatable about the first and second axes, respectively.

A non-steerable sulky is shown in U.S. Pat. No. 6,247,711. The sulky includes a frame and first and second wheel supports pivotally mounted to the frame at a pivot connection. A wheel is rotatably mounted to each of the wheel supports. The wheel supports are configured to pivot around the pivot connection upon the exertion of a sideways displacement force at the wheels. In other words, the wheel supports freely pivot relative to each other.

One drawback to such a design is that the rider is not in control of the pivoting wheel supports. In other words, when the wheels are subject to a sideways force, such as from traversing around a bend, the wheels pivot and move. As a result, the driver has no control over the direction of the sulky. Such drawbacks are eliminated by steerable sulkies.

A steerable sulky is disclosed in U.S. Pat. No. 4,817,975 to Saraydar. Specifically, Saraydar discloses a frame including a first shaft, a second shaft spaced from the first shaft, and a cross-member coupled to the first and second shafts. A first pedal is opertatively coupled to the frame and a second pedal is operatively coupled to the frame. The first pedal is moveable relative to the frame for selectively rotating the first wheel support relative to the frame about the first axis. Likewise, the second pedal is moveable relative to the frame for selectively rotating the second wheel support relative to the frame about the second axis. As such, the first and second wheel supports are independently steerable relative to the frame.

With such a design, the rider has difficulty controlling the rotation of one of the wheel supports relative to the other wheel support. In other words, when the wheels are subject to a sideways force, such as from traversing around a bend, the wheel supports rotate relative to each other. In such a situation, the wheel supports may each rotate in different directions thereby compromising the stability of the sulky. In other words, the sulky bounces and skids or even flips over if the wheel supports are rotated in different directions relative to each other. The difficulty for the rider arises in that the rider must monitor the rotational position of both wheel supports and rotate each wheel support accordingly to avoid compromising the stability of the sulky. Further, the rotation of the wheel supports relative to the frame may be impacted based upon conditions at the track. If the ground is particularly sloppy or muddy, the wheels may be subjected to sideways forces even though the sulky is being pulled straight. In other words, mud forces the wheel supports to rotate relative to each other and the rider has difficulty maintaining the rotation of the wheel supports relative to each other.

Accordingly, it would be advantageous to design a sulky that allows the person riding the sulky to steer the sulky while avoiding the disadvantages associated with wheel supports that rotate independently relative to each other.

SUMMARY OF THE INVENTION AND ADVANTAGES

The present invention is a sulky comprising a frame including a first shaft, a second shaft spaced from the first shaft, and a cross-member coupled to the first and second shafts. A first wheel support extends from the frame along a first axis. The first wheel support is rotatably coupled to the frame about the first axis. A second wheel support is spaced from the first wheel support and extends from the frame along a second axis. The second wheel support is rotatably coupled to the frame about the second axis. A first pedal is operatively coupled to the frame and to the first wheel support. The first pedal is moveable relative to the frame for selectively rotating the first wheel support about the first axis. A second pedal is operatively coupled to the frame and to the second wheel support. The second pedal is moveable relative to the frame for selectively rotating the second wheel support about the second axis. A linkage operatively couples the first and second wheel supports for transferring movement of one of the first and second pedals to both of the first and second wheel supports to rotate the first and second wheel supports in unison respectively about the first and second axes.

Accordingly, the sulky is steerable and the first and second wheel supports rotate about the first and second axes, respectively, in unison. Such a configuration eliminates the need for the rider to steer both of the first and second wheel supports independently, thereby eliminating the need for the rider to monitor and adjust the wheel supports independently. In other words, the rider steers both the first and second wheel supports in unison by moving one of the first and second pedals. Such a configuration also eliminates the possibility that one wheel support will rotate relative to the other in response to driving conditions or ground conditions. As such, the configuration eliminates the possibility of the first and second wheel supports rotating in separate directions which compromises the stability of the sulky.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like parts throughout the several views, a sulky 20 is generally shown. Specifically, the sulky 20 may be used in a type of horse racing commonly referred to as harness racing, or more specifically, low-wheeled harness racing. In harness racing, a rider rides on the sulky 20, which is harnessed to a horse, and the horse pulls the sulky 20 around a track. It should be appreciated that the sulky 20 may be any type of horse drawn vehicle without departing from the nature of the present invention.

As shown in FIGS. 1-3C, the sulky 20 includes a frame 22. Specifically, the frame 22 includes a first shaft 24, a second shaft 26, and a cross-member 28. The first and second shafts 24, 26 are also referred to by those skilled in the art as thills. The first and second shafts 24, 26 and the cross-member 28 are formed from any material known to one skilled in the art. For example, the first and second shafts 24, 26 and the cross-member 28 are formed of metal tubes. More specifically, for example, the first and second shafts 24, 26 and the cross-member 28 are formed of aluminum, stainless steel, carbon fiber, or titanium.

The first and second shafts 24, 26 are spaced from each other and the first and second shafts 24, 26 extend generally in parallel. The first and second shafts 24, 26 are harnessed to the horse in any manner known to one skilled in the art. For example, a hitch is mounted to the horse and the first and second shafts 24, 26 are coupled with the hitch. Alternatively, the shafts 24, 26 may be strapped about the body of the horse.

Figure 3A:
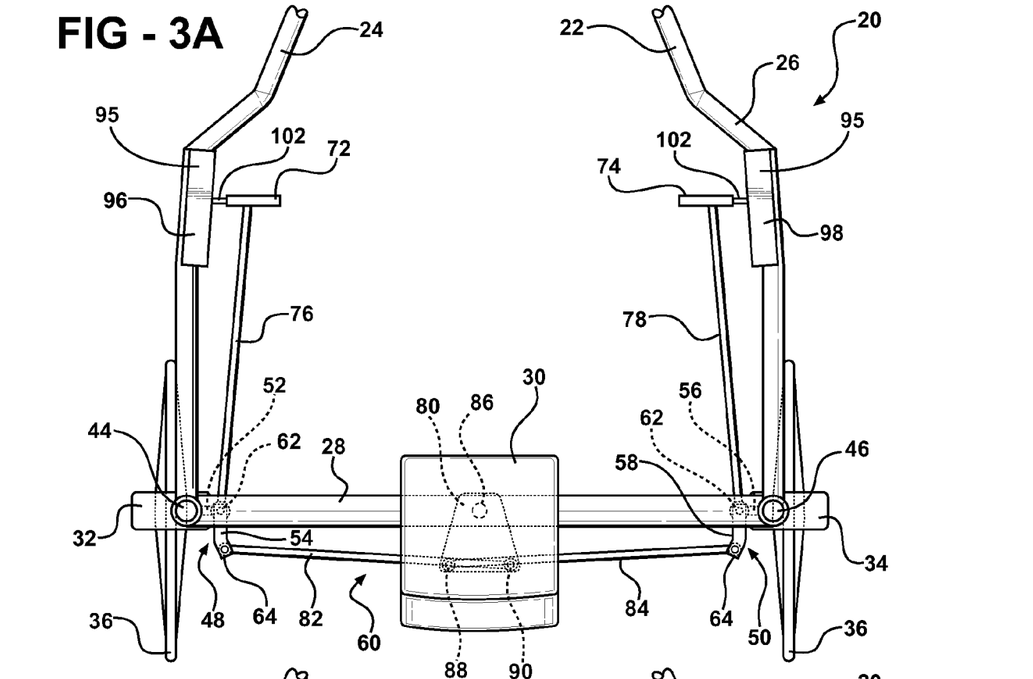
FIG. 3A is a top view of the sulky with wheel supports of the sulky rotated to steer the sulky straight.
Figure 3B:
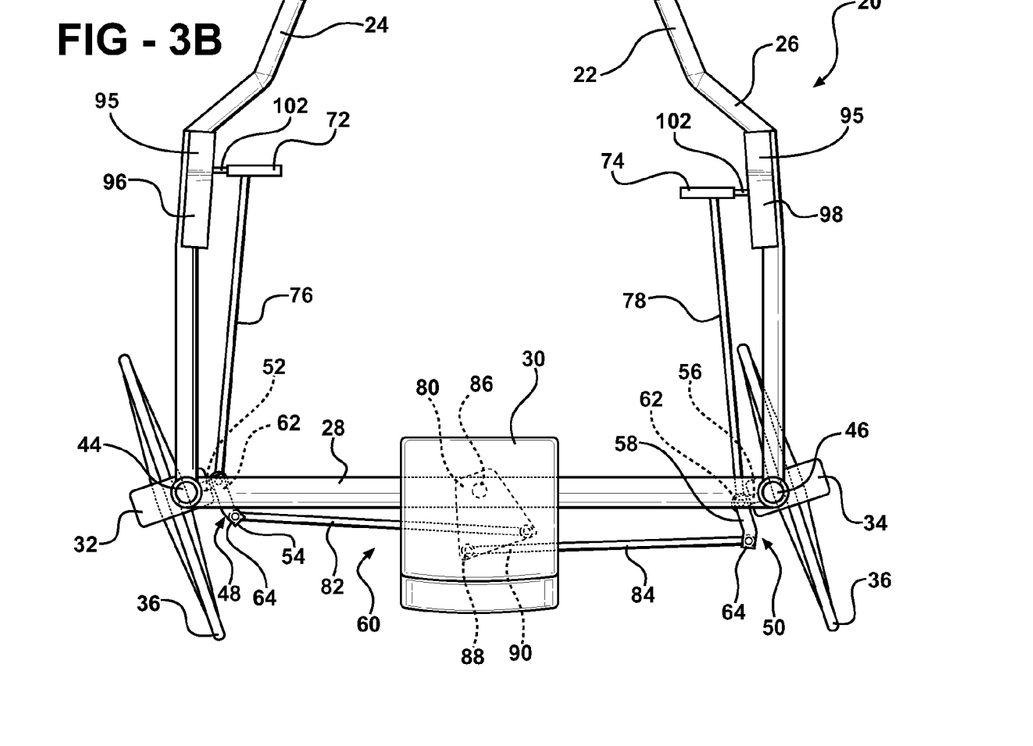
FIG. 3B is a top view of the sulky with the wheel supports rotated to steer the sulky to the right.
Figure 3C:
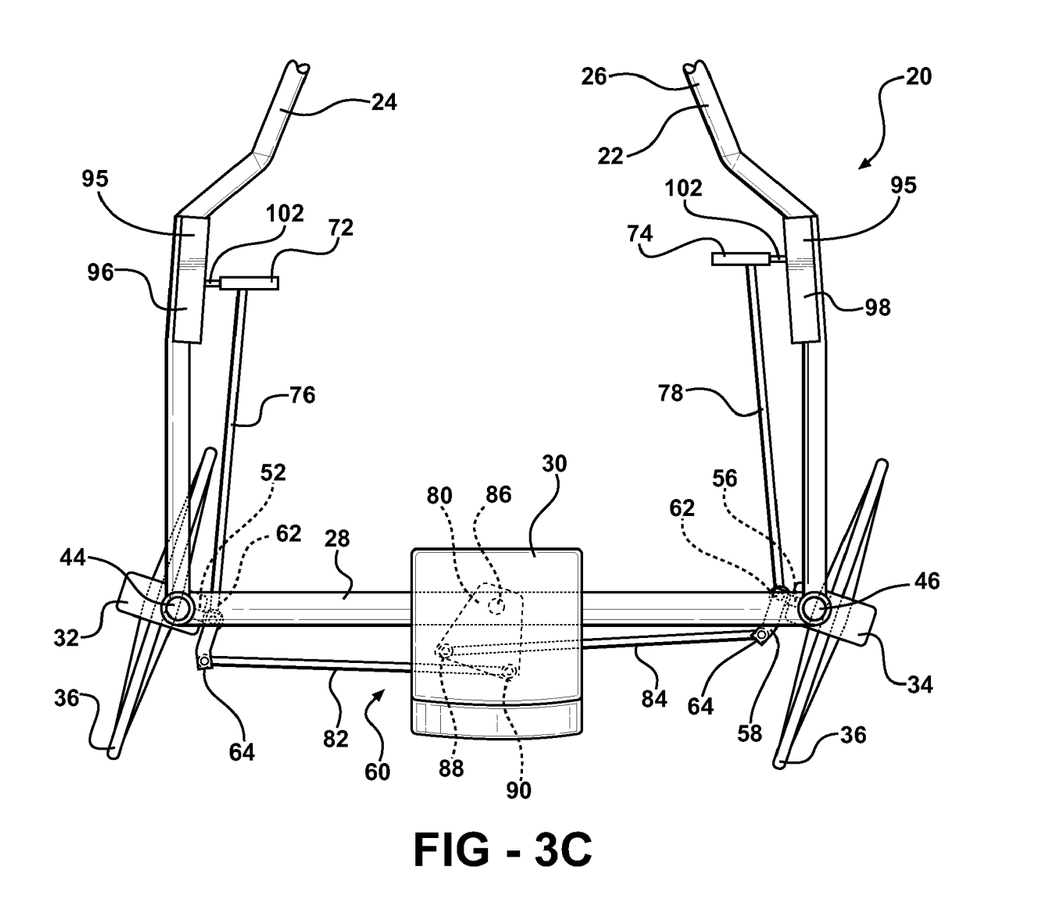
FIG. 3C is a top view of the sulky with the wheel supports rotated to steer the sulky to the left.

The cross-member 28 extends between and is coupled to the first and second shafts 24, 26. As best shown in FIGS. 3A-3C, the first and second shafts 24, 26 and the cross-member 28 are positioned such that the frame 22 is generally U-shaped. A seat 30 is supported on to the cross-member 28 for supporting the rider. Specifically the seat 30 is mounted at the midpoint of the cross-member 28 and is spaced equidistantly from the first and second shafts 24, 26.

Figure 1:
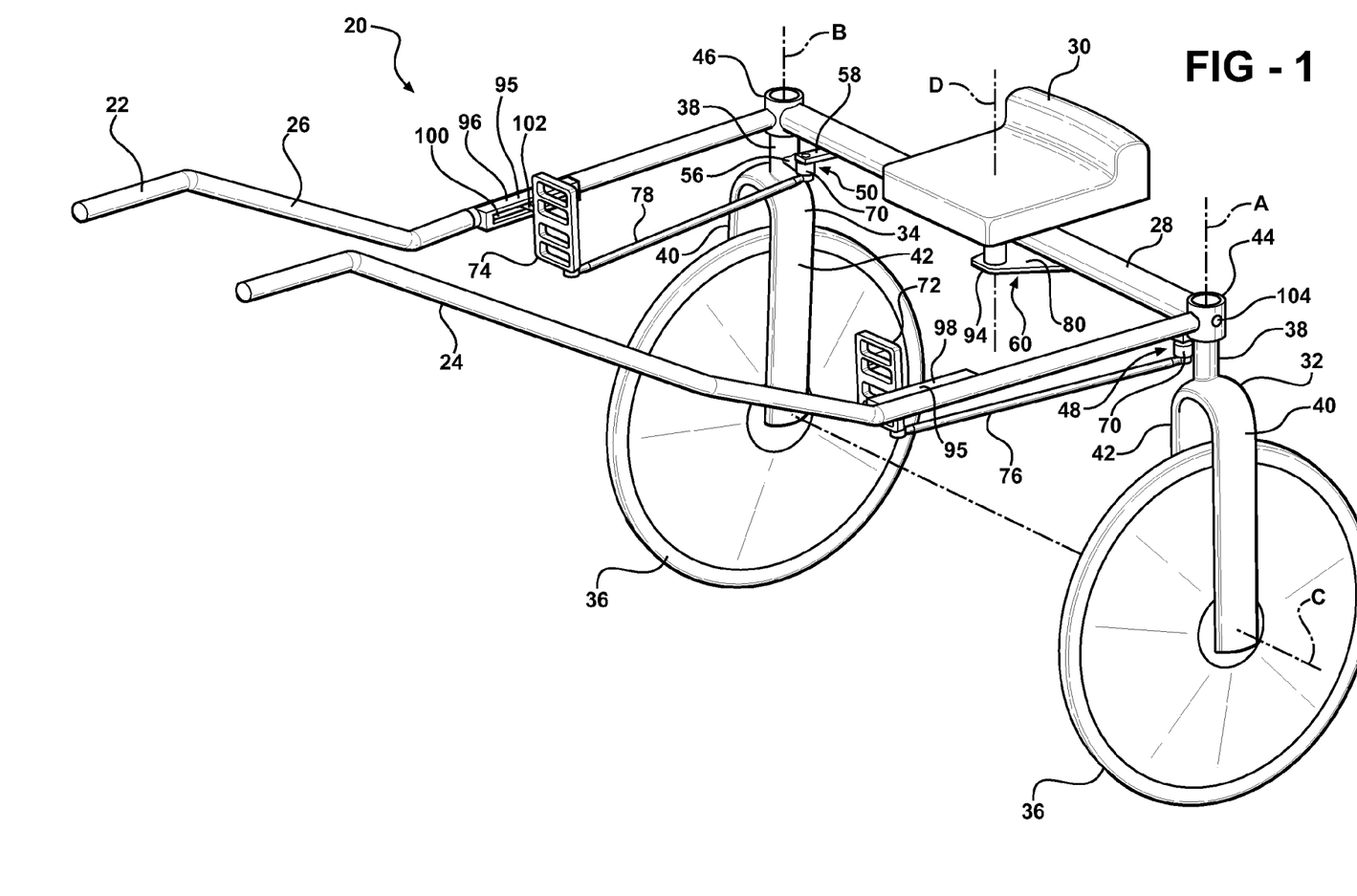
FIG. 1 is a front perspective view of a sulky.
Figure 2:
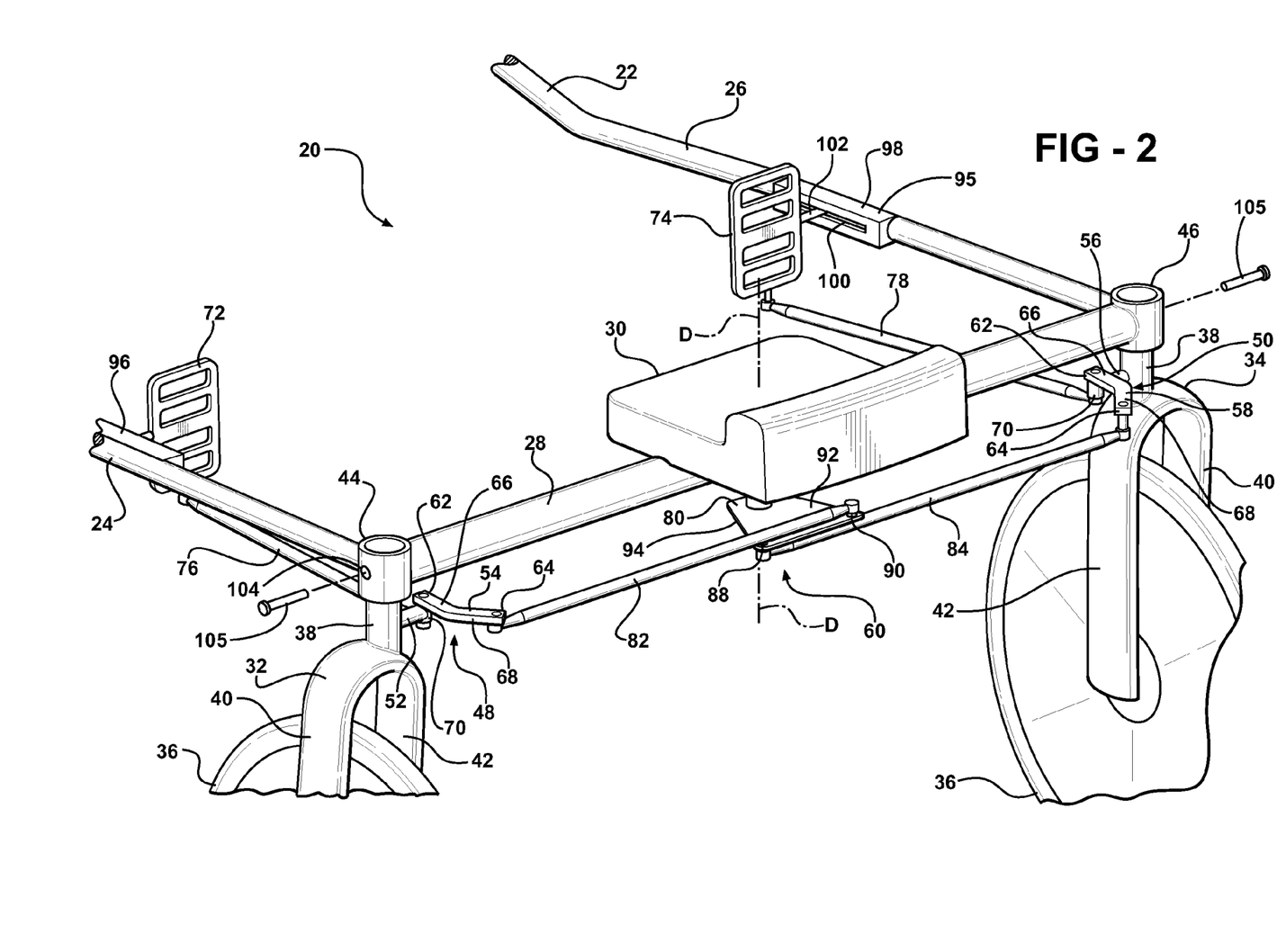
FIG. 2 is a rear perspective view of the sulky.

As best shown in FIGS. 1-2, the sulky 20 includes a first and second wheel support 32, 34 spaced from each other and a pair of wheels 36 mounted to the first and second wheel supports 32, 34. Specifically, one of the pair of wheels 36 is rotatably mounted to the first wheel support 32 and the other of the pair of wheels 36 is rotatably mounted to the second wheel support 34.

The first wheel support 32 extends from the frame 22 along a first axis A and the first wheel support 32 is rotatably coupled to the frame 22 about the first axis A. The second wheel support 34 extends from the frame 22 along a second axis B and the second wheel support 34 is rotatably coupled to the frame 22 about the second axis B. As will be discussed below, the first and second wheel supports 32, 34 are rotatable about the first and second axes A, B, respectively, so that the rider may rotate the first and second wheel supports 32, 34 to steer the sulky 20. The first axis A and the second axis B extend in parallel with each other. Alternatively, the first and second axes A, B extend at an angle relative to each other such that the wheels are cambered inwardly from bottom to top, i.e., have a negative camber.

Each of the first and second wheel supports 32, 34 include an arm 38 rotatably connected to the frame 22 and a first and second prong 40, 42 extending from the arm 38 in a forked relationship. The wheel 36 is partially disposed between the first and second prong 40, 42. Specifically, the wheel 36 is mounted to the first and second prong 40, 42 along a rotational axis C of the wheel 36. For example, the wheel 36 may include an axle and a rim rotatable about the axle. In such a configuration, the axle extends between and is attached to the first and second prongs 40, 42.

The frame 22 includes a first sleeve 44 and a second sleeve 46. The first wheel support 32 is rotatably engaged with the first sleeve 44 and the second wheel support 34 is rotatably engaged with the second sleeve 46. The first sleeve 44 is mounted to at least one of the first shaft 24 and the cross-member 28 and the second sleeve 46 is mounted to at least one of the second shaft 26 and the cross-member 28. In the embodiment shown in FIGS. 1-3C, the cross-member is attached to and extends between the first and second sleeves 44, 46. In such an embodiment, the first shaft 24 extends from the first sleeve 44 and the second shaft 26 extends from the second sleeve 46. For example, a rotational coupling is disposed between the first and second wheel supports 32, 34 and the first and second sleeves 44, 46, respectively. Specifically, for example, the rotational coupling is a radial ball bearing.

A first and second link 48, 50 are coupled to and laterally extend from the first and second wheel support 32, 34. Specifically, the first link 48 includes a first bracket 52 and a first pivoting member 54 and the second link 50 includes a second bracket 56 and a second pivoting member 58. The first and second brackets 52, 56 extend laterally from the first and second wheel supports 32, 34, respectively.

The first pivoting member 54 of the first link 48 is pivotally coupled to the first bracket 52 and to the linkage 60. The second pivoting member 58 of the second link 50 is pivotally coupled to the second bracket 56 and to the linkage 60. The first and second pivoting members 54, 58 each extend between a first end 62 and a second end 64. The first end 62 is pivotally coupled to the first bracket 52 and the second end 64 is pivotally coupled to the linkage 60. Specifically, the first and second pivoting members 54, 58 include first and second legs 66, 68 extending from each other defining a V-shape. More specifically, the first leg 66 presents the first end 62 and the second leg 68 presents the second end 64.

As best shown in FIG. 2, the first and second brackets 52, 56 extend away from the first and second axes A, B, respectively. Specifically, the first bracket 52 presents a distal end 70 spaced from the first wheel support 32 with the first pivoting member 54 pivotally coupled to the distal end 70 of the first bracket 52. Likewise, the second bracket 56 presents a distal end 70 spaced from the second wheel support 34 with the second pivoting member 58 pivotally coupled to the distal end 70 of the second bracket 56. As such, force may be exerted on the distal ends 70 to rotate the first and second wheel supports 32, 34 about the first and second axes A, B, respectively. In other words, the first and second brackets 52, 56 each act as a moment arm for rotating the first and second wheel supports 32, 34, respectively.

A first pedal 72 is operatively coupled to the frame 22 and to the first link 48. The first pedal 72 is moveable relative to the frame 22 for selectively rotating the first wheel support 32 relative to the frame 22 about the first axis A. Likewise, a second pedal 74 is operatively coupled to the frame 22 and to the second link 50. The second pedal 74 is moveable relative to the frame 22 for selectively rotating the second wheel support 34 relative to the frame 22 about the second axis B.

Specifically, a first pedal rod 76 extends from the first pedal 72 to the first link 48 and a second pedal rod 78 extends from the second pedal 74 to the second link 50. More specifically, the first and second pedal rods 76, 78 are coupled to the first and second brackets 52, 56 of the first and second links 48, 50, respectively. As best shown in FIG. 2, the first pedal rods 76, the first end 62 of the first pivoting member 54, and the distal end 70 of the first bracket 52 are aligned and pivotally connected to each other. Likewise, the second pedal rod 78, the first end 62 of the first pivoting member 56, and the distal end 70 of the second bracket 54 are aligned and pivotally connected to each other.

A linkage 60 extends between and is operatively coupled to the first and second wheel supports 32, 34 for transferring movement of one of the first and second pedals 72, 74 to both of the first and second wheel supports 32, 34 to rotate the first and second wheel supports 32, 34 in unison respectively about the first and second axes A, B. Specifically, the linkage is coupled to the first and second links 48, 50. The rider exerts a forward force on one of the first and second pedals 72, 74 to rotate one of the first and second wheel supports 32, 34, respectively, about one of the first and second axes A, B, respectively. Because the linkage 60 transfers movement of one of the first and second links 48, 50 to the other of the first and second links 48, 50, exertion of a forward force on one of the first and second pedals 72, 74 results in both the first and second wheel supports 32, 34 rotating in unison about the first and second axes A, B, respectively.

As shown in FIG. 3A, the first and second wheel supports 32, 34 are rotated about the first and second axes A, B, respectively, such that the sulky 20 will roll in a straight line. As shown in FIG. 3B, the first and second wheel supports 32, 34 are rotated about the first and second axes A, B, respectively, such that the sulky 20 will roll to the right when pulled. The rotation of the first and second wheel supports 32, 34 shown in FIG. 3B is achieved by application of a forward force by the rider on the first pedal 72. As shown in FIG. 3C, the first and second wheel supports 32, 34 are rotated about the first and second axes A, B, respectively, such that the sulky 20 will roll to the left when pulled. The rotation of the first and second wheel supports 32, 34 shown in FIG. 3C is achieved by application of a forward force by the rider on the second pedal 74.

The linkage 60 includes a first bar 82 pivotally coupled to the first wheel support 32 and a second bar 84 pivotally coupled to the second wheel support 34. A middle link 80 interconnects the first and second bars 82, 84. The first bar 82 extends between and is pivotally coupled to the middle link 80 and the first wheel support 32. The second bar 84 extends between and is pivotally coupled to the middle link 80 and the second wheel support 34. The middle link 80 is pivotally coupled to the frame about a middle axis D.

Specifically, the middle link 80 includes a main pivot point 86 rotatably coupled to the frame 22 about a middle axis D and a first and second pivot point 88, 90 spaced from each other and from the main pivot point 86. The first bar 82 is pivotally coupled to the first pivot point 88 and the second bar 84 is pivotally coupled to the second pivot point 90.

As such, as shown in FIG. 3B, when forward force is exerted on the first pedal 72, the first wheel support 32 is rotated counter-clockwise about the first axis A and the first link 48 is moved. Movement of the first link 48 is transferred to the first bar 82 thereby moving the first bar 82 generally towards the first wheel support 32. The movement of the first bar 82 rotates the middle link 80 counter-clockwise about the middle axis D thereby moving the second bar 84 generally toward the first wheel support 32. The movement of the second bar 84 results in movement of the second link 50, thereby rotating the second wheel support 34 counter-clockwise about the second axis B. Likewise, as shown in FIG. 3C, when force is exerted on the second pedal 74, the linkage operates in an opposite direction as when force is exerted on the first pedal 72. When force is exerted on the second pedal 74, both the first and second wheel supports 32, 34 rotate clockwise about the first and second axes A, B, respectively, and the middle link 80 is rotated clockwise.

As best shown in FIGS. 1-3C, the middle link 80 is generally shaped as an isosceles trapezoid. The main pivot point 86 is generally positioned at the middle of the short base of the trapezoid and the first and second pivot points 88, 90 are generally positioned at opposite corners of the long base of the trapezoid. It is to be appreciated that this configuration is not intended to limit the invention and other geometrical shapes could be used with the present invention.

Specifically, the cross-member 28 and the middle link 80 include interconnecting posts at the main pivot point 86. The interconnecting posts are rotatable relative to each other. For example, a rotational coupling is disposed between the interconnecting posts. Specifically, for example, the rotational coupling is a radial ball bearing.

The middle link 80 presents a top surface 92 and a bottom surface 94 with one of the first and second bars 82, 84 pivotally coupled to, or engaging, the middle link 80 at the top surface 92 and with the other of the first and second bars 82, 84 pivotally coupled to, or engaging, the middle link 80 at the bottom surface 94. Specifically, as best shown in FIG. 2, the first bar 82 extends across the top surface 92 and is pivotally coupled to the middle link 80 at the top surface 92 and the second bar 84 extends across the bottom surface 94 and is pivotally coupled to the middle link 80 at the bottom surface 94. Such an arrangement prevents interference between the first and second bars 82, 84 as the middle link 80 is rotated.

The frame 22 includes at least one limiter 95 supported by the frame 22 and engaging at least one of the first and second pedals 72, 74 for limiting movement of that pedal. The limiter 95 is shown as a slot 100 and at least one of the first and second pedals 72, 74 includes a peg 102 extending into and slideably engaging the slot 100. Specifically, the limiter 95 is further defined as a first limiter 96 mounted to the first shaft 24 and a second limiter 98 mounted to the second shaft 26. The first pedal 72 is slideably engaged with the first limiter 96 and the second pedal 74 is slideably engaged with the second limiter 98. Specifically, the first and second limiters 96, 98 are hollow rectangular boxes mounted to the first and second shafts 24, 26, respectively. The first and second limiters 96, 98 each define a cavity 99 and a slot 100 that is elongated in shape. The first and second pedals 72, 74 each include a peg 102 extending into the cavity 99 and slideably engaged with the slot 100. The engagement of the peg 102 in the slot 100 supports 32, 34 each of the first and second pedals 72, 74 and guides the pedals 72, 74 when the pedals 72, 74 are moved relative to the frame 22. The peg 102 may include a protrusion disposed inside the cavity 100 for retaining the peg 102 in the slot 100. It is to be appreciated by one of ordinary skill in the art that other limiters may be used with the subject invention. For example, the limiter may be disposed between the wheel supports and the linkage or between the wheel supports and the frame. The above described limiter 95 is not intended to limit the subject invention.

Alternatively, the pedals 72, 74 may rotate relative to the frame 22 to rotate the first and second wheel supports 32, 34. In other words, in such an embodiment, the pedals 72, 74 are rotatably engaged with the first and second limiters 96, 98, respectively. For example, the first and second pedals 72, 74 each have a finger rotatably engaged with the first and second limiters 96, 98, respectively. The first and second pedal rods 76, 78 are coupled to the first and second pedals 72, 74 spaced from the fingers such that rotation of the pedal rods 76, 78 about the fingers results in translation of the first and second pedal rods 76, 78 relative to the frame 22.

The sulky 20 is arranged such that the rotation of the first and second wheel supports 32, 34 have a limited rotation about the first and second axes A, B, respectively. For example, the rotation of the first and second wheel supports 32, 34 is limited to 3-5°. Such limited rotation allows the rider to steer the sulky 20 when necessary while avoiding the problem of having the first and second wheel supports 32, 34 rotating to an extreme angle, which could lead to an overturning of the sulky 20 as the horse pulls the sulky 20 in a generally straight line. The amount of rotation may be varied depending upon the particular sulky 20 and/or other factors relating to the sulky 20, such as horse type, racing conditions, etc.

In one embodiment, the configuration of the linkage 60 and the first and second links 48, 50 are designed to limit the rotation of the first and second wheel supports 32, 34 about the first and second axes A, B. Factors that affect the rotational travel of the first and second wheel supports 32, 34 include the length of the first and second bars 82, 84, the spacing between the first and second pivot points 88, 90, the length and bend of the first and second links 48, 50, and the spacing between the main pivot point 86 and the first and second pivot points 88, 90. In other words, these factors are designed to limit the rotation of the first and second wheel supports 32, 34.

In another embodiment, the location of the first and second limiters 96, 98 on the first and second shafts 24, 26, respectively, and the length of the first and second pedal rods 76, 78 are designed to limit the rotation of the first and second wheel supports 32, 34 about the first and second axes A, B. In another embodiment, the first and second wheel supports 32, 34 and/or the frame 22 may include a limiting device that mechanically limits the rotation of the first and second wheel supports 32, 34 relative to the frame 22. For example, the limiting device is a pair of bars fixed to the first and second wheel supports 32, 34 such that the bars engage the frame when the first and second wheel supports 32, 34 reach a predetermined angle.

The sulky 20 further includes a locking device for locking the rotation of the first and second wheel supports 32, 34 about the first and second axes A, B, respectively. Specifically, the locking device locks the first and second wheel supports 32, 34 so that the wheels 36 are pointed straight as shown in FIG. 3A. For example, the locking device may be used when certain ground conditions exist wherein it would be advantageous that the first and second wheel supports 32, 34 are locked relative to the frame 22. Alternatively, in the scenario wherein the sulky 20 is used in harness racing, i.e. the sulky, certain racing rules and regulations may require that the first and second wheel supports 32, 34 are locked relative to the frame 22.

In one embodiment, the locking device may be disposed on the first and second wheel supports 32, 34 to prevent rotation of the wheel supports 32, 34 about the first and second axes A, B, respectively. For example, as shown in FIG. 2, the locking device are further defined as pins 105 that extend through holes 104 through the first and second sleeves 44, 46 and the arm 38 of each of the first and second wheel supports 32, 34 to prevent rotation of the first and second wheel supports 32, 34 relative to the first and second sleeves 44, 46. The pins 105 may be retained in the holes 104 in any manner known to one skilled in the art. Examples include a cotter pin engaging each pin 105 or a threaded engagement between the pins 105 and the sleeves 44 and/or wheel supports 32, 34.

In another embodiment, the locking device is further defined as a spacer disposed in the cavity 99 of each of the first and second limiters 96, 98 to prevent the peg 102 from moving in the slot 100. The spacer may be mounted to the peg 102 or may be mounted to the limiter 96, 98. For example, the spacer may effectively limit the size of the slot 100 such that the peg 102 is mechanically prevented from moving in the slot 100. In another embodiment, the locking device may be disposed on the linkage 60 to prevent the linkage 60 from rotating about the middle axis D. For example, the locking device may be a pin that extends through the interconnecting posts of the frame 22 and the middle link 80 to prevent rotation of the middle link 80 about the middle axis D.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A sulky comprising:
   a frame including a first shaft, a second shaft spaced from said first shaft, and a cross-member coupled to said first and second shafts;
   a first wheel support extending from said frame along a first axis with said first wheel support rotatably coupled to said frame about said first axis;
   a second wheel support spaced from said first wheel support and extending from said frame along a second axis with said second wheel support rotatably coupled to said frame about said second axis;
   a first pedal operatively coupled to said frame and to said first wheel support with said first pedal moveable relative to said frame for selectively rotating said first wheel support about said first axis;
   a second pedal operatively coupled to said frame and to said second wheel support with said second pedal moveable relative to said frame for selectively rotating said second wheel support about said second axis; and
   a linkage operatively coupling said first and second wheel supports for transferring movement of one of said first and second pedals to both of said first and second wheel supports to rotate said first and second wheel supports in unison respectively about said first and second axes.

2. The sulky as set forth in claim 1 wherein said linkage includes a first bar pivotally coupled to said first wheel support and a second bar pivotally coupled to said second wheel support.

3. The sulky as set forth in claim 2 wherein said linkage includes a middle link interconnecting said first and second bars with said first bar extending between and pivotally coupled to said middle link and said first wheel support and with said second bar extending between and pivotally coupled to said middle link and said second wheel support.

4. The sulky as set forth in claim 3 wherein said middle link is pivotally coupled to said frame about a middle axis.

5. The sulky as set forth in claim 3 wherein said middle link includes a first and second pivot points spaced from each other with said first bar pivotally coupled to said first pivot point and with said second bar pivotally coupled to said second pivot point for rotating said middle link about said main axis.

6. The sulky as set forth in claim 3 wherein said middle link presents a top surface and a bottom surface with one of said first and second bars pivotally engaging top surface and with the other of said first and second bars pivotally engaging said bottom surface.

7. The sulky as set forth in claim 1 further including a first link coupled to said first wheel support and a second link coupled to said second wheel support.

8. The sulky as set forth in claim 7 wherein said first link includes a first bracket extending laterally from said first wheel support and a first pivoting member pivotally coupled to said first bracket and said linkage.

9. The sulky as set forth in claim 8 wherein said first pivoting member extends between a first end and a second end with said first end pivotally coupled to said first bracket and with said second end pivotally coupled to said linkage.

10. The sulky as set forth in claim 7 wherein said second link includes a second bracket extending laterally from said second wheel support and a second pivoting member pivotally coupled to said second bracket and said linkage.

11. The sulky as set forth in claim 10 wherein said second pivoting member extends between a first end and a second end with said first end pivotally coupled to said second bracket and with said second end pivotally coupled to said linkage.

12. The sulky as set forth in claim 1 including at least one limiter supported by said frame and engaging at least one of said first and second pedals for limiting movement of said pedal.

13. The sulky as set forth in claim 12 wherein said limiter defines a slot and wherein at least one of said first and second pedals includes a peg extending into and slideably engaged with said slot.

14. The sulky as set forth in claim 1 including a seat supported by said cross-member for supporting a rider.

15. The sulky as set forth in claim 1 including a first sleeve mounted to at least one of said first shaft and said cross-member and a second sleeve mounted to at least one of said second shaft and said cross-member with said first wheel support rotatably engaged in said first sleeve and said second wheel support rotatably engaged in said second sleeve.

16. The sulky as set forth in claim 1 including a pair of wheels with one of said pair of wheels rotatably mounted to said first wheel support and with the other of said pair of wheels rotatably mounted to said second wheel support.

17. The sulky as set forth in claim 1 wherein each of said first and second wheel supports include an arm rotatably connected to said frame and first and second prongs extending from said arm in a forked relationship.

18. The sulky as set forth in claim 1 further including a first pedal rod extending from said first pedal and coupled to said linkage and a second pedal rod extending from said second pedal and coupled to said linkage.

\* \* \* \* \*